US012739017B2

(12) United States Patent
Lu et al.

(10) Patent No.: US 12,739,017 B2
(45) Date of Patent: Sep. 15, 2026

(54) CELL SHAPING WITH REINFORCED LEARNING

(71) Applicant: Telefonaktiebolaget LM Ericsson (publ), Stockholm (SE)

(72) Inventors: Guoqiang Lu, Ottawa (CA); Xixian Chen, Ottawa (CA); Haomin Li, Kanata (CA); Edward Mah, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/838,070

(22) PCT Filed: Feb. 14, 2022

(86) PCT No.: PCT/IB2022/051301

§ 371 (c)(1),
(2) Date: Aug. 13, 2024

(87) PCT Pub. No.: WO2023/152554

PCT Pub. Date: Aug. 17, 2023

(65) Prior Publication Data

US 2025/0150153 A1 May 8, 2025

(51) Int. Cl.
*H04B 7/10* (2017.01)

(52) U.S. Cl.
CPC .................................... *H04B 7/10* (2013.01)

(58) Field of Classification Search
CPC ...................................................... H04B 7/10

(Continued)

(56) References Cited

U.S. PATENT DOCUMENTS

| | | | | |
|---|---|---|---|---|
| 2012/0033759 A1 | 2/2012 | Goransson et al. | | |
| 2016/0162783 A1* | 6/2016 | Tan | ....................... | H04W 24/02 706/13 |

(Continued)

FOREIGN PATENT DOCUMENTS

WO 2021079173 A1 4/2021

OTHER PUBLICATIONS

International Search Report and Written Opinion dated Sep. 28, 2022 for International Application No. PCT/IB2022/051301 filed Feb. 14, 2022, consisting of 13 pages.

(Continued)

*Primary Examiner* — Lihong Yu
(74) *Attorney, Agent, or Firm* — Weisberg I.P. Law, P.A.

(57) ABSTRACT

A method and network node for cell shaping with reinforced learning are disclosed. In some embodiments, for each of a plurality of phase offset trial values: a first reward in response to first trial value applied to antenna elements having a first polarization is determined. A second reward in response to a second trial value applied to antenna elements having a second polarization is determined. A first phase offset apply to the antenna element having the first polarization is determined based at least in part on the plurality of first rewards and on a probable reward in response to the first phase offset. A second phase offset to be applied to antenna elements having the second polarization is determined based at least in part on the plurality of second rewards and on a probable reward in response to the second phase offset.

18 Claims, 6 Drawing Sheets

(58) Field of Classification Search
USPC .......................................................... 375/267
See application file for complete search history.

(56) References Cited

U.S. PATENT DOCUMENTS

| | | | | |
|---|---|---|---|---|
| 2016/0337931 | A1* | 11/2016 | Wang .................... | H04W 48/20 |
| 2017/0141894 | A1* | 5/2017 | Wei ...................... | H04B 17/309 |
| 2020/0019871 | A1* | 1/2020 | Balakrishnan ......... | G06N 5/045 |
| 2020/0212986 | A1* | 7/2020 | Nilsson ................ | H04B 7/0894 |
| 2021/0344390 | A1 | 11/2021 | Long et al. | |
| 2024/0205775 | A1* | 6/2024 | He ........................ | H04W 36/08 |

OTHER PUBLICATIONS

3GPP TSG RAN WG1 Meeting #82bis R1-155955; Title: Discussion on Beamformed CSI-RS based CSI report; Agenda Item: 7.2.4.3.2; Source: Huawei, HiSilicon; Document for: Discussion and decision; Date and Location: Oct. 5-9, 2015, Malmo, Sweden, consisting of 4 pages.

3GPP TS 38.214 V16.7.0; 3rd Generation Partnership Project; Technical Specification Group Radio Access Network; NR; Physical layer procedures for data (Release 16); Sep. 2021, consisting of 172 pages.

3GPP TS 36.211 V16.7.0; 3rd Generation Partnership Project; Technical Specification Group Radio Access Network; Evolved Universal Terrestrial Radio Access (E-UTRA); Physical channels and modulation (Release 16); Sep. 2021, consisting of 249 pages.

Wang, Z.; An Adaptive Direction-Dependent Polarization State Configuration Method for High Isolation in Polarimetric Phased Array Radar; IEEE Transactions on Antennas and Propagation, vol. 69, No. 6; Jun. 2021, consisting of 16 pages.

Fozi, M. et al.; Fast MIMO Beamforming via Deep Reinforcement Learning for high Mobility mmWave Connectivity; IEEE Journal on Selected Areas in Communications, vol. 40, No. 1; Jan. 2022, consisting of 16 pages.

3GPP TS 38.211 V16.7.0; 3rd Generation Partnership Project; Technical Specification Group Radio Access Network; NR; Physical channels and modulation (Release 16); Sep. 2021, consisting of 134 pages.

* cited by examiner

Wireless Device 22

SW 56

Client application 58

HW 44

Radio interface 46

Antennas 48

Processing circuitry 50

Memory 54

Processor 52

32

Network Node 16

SW 42

HW 28

Radio interface 30

Antennas 34

Processing circuitry 36

Memory 40

Processor 38

Beamformer Unit 24

RSRP Unit 26

CELL SHAPING WITH REINFORCED LEARNING

CROSS-REFERENCE TO RELATED APPLICATION

This application is a Submission Under 35 U.S.C. § 371 for U.S. National Stage Patent Application of International Application Number: PCT/IB2022/051301, filed Feb. 14, 2022 entitled "CELL SHAPING WITH REINFORCED LEARNING," the entirety of which is incorporated herein by reference.

TECHNICAL FIELD

The present disclosure relates to wireless communications, and in particular, to cell shaping with reinforced learning.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs.

A common practice in LTE and NR radio base stations is to use multiple antennas with dual polarizations to increase the user signal to interference plus noise ratio (SINR) through beamforming. Beamforming requires the phases of antenna branches of the same polarization to be aligned so that cohesive signal addition can be achieved at the WD. Phase alignment requires antenna phase calibration to be performed periodically at the base station. However, for various reasons such as hardware cost, software complexity, etc., certain radios with fewer branches such as one with four transmit and four receive branches (4T4R) do not have phase calibration. As a result, the phase on any branch of the radio can be anywhere between 0 and 360 degrees and so can be the beam directions of each polarization. This poses challenges on how to select the beamforming weight for any signals and channels that are meant to provide a predefined coverage shape which are often seen with the synchronization signals and physical broadcast channel (PBCH) (which is referred as a synchronization signal block (SSB) since the synchronization signals are always associated with the PBCH). If the beam directions of the common beamforming weight for an SSB are such that they point away from a cluster of WDs, coverage may be impaired. Even with calibrated antennas, a fixed common beamforming weight may not be optimal for different cells with different user distributions.

Some radios, such as four branch radios, run without phase calibration and with a fixed common weight for all cells. As a result, different cells will have random coverage shape regardless of the geographical distribution of the WDs intended to be served by the beams. As a result, more cells may be required to improve coverage. To mitigate the problem of unknown common beam direction, it has been suggested to use only one branch from each polarization for common weight. However, this will also reduce the coverage due to 50% of power utilization.

SUMMARY

Some embodiments advantageously provide methods, systems, and apparatuses for cell shaping with reinforced learning.

In some embodiments, the common weight for 4-branch radio, for example, can take the general form [1 $e^{\Delta_A}$ 1 $e^{\Delta_B}$] with each weight in the vector applied to antenna branches (elements) 0, 1, 2, 3, respectively, where branches 0 and 1 are of a first polarization A and antenna branches 2 and 3 are of a second polarization B. In some embodiments, values of $\Delta_A$, $\Delta_B$ are determined using reinforced learning.

According to one aspect, a network node is configured to determine precoder weights to be applied to antenna elements of an array of antenna elements. The network node includes processing circuitry configured to: for each of a plurality of phase offset trial values: determine a first reward in response to first phase offset trial value applied to each of at least one antenna element having a first polarization; and determine a second reward in response to a second phase offset trial value applied to each of at least one antenna element having a second polarization. The processing circuitry is also configured to determine a subsequent first phase offset to be applied to each of the at least one antenna element having the first polarization based at least in part on the plurality of first rewards and based at least in part on a probable reward in response to the subsequent first phase offset; and determine a subsequent second phase offset to be applied to each of the at least one antenna element having the second polarization based at least in part on the plurality of second rewards and based at least in part on a probable reward in response to the subsequent second phase offset.

In some embodiments, determining a subsequent phase offset is based at least in part on a Thompson sampling algorithm. In some embodiments, the Thompson sampling algorithm is configured to model the probable reward based at least in part on a Gaussian distribution. In some embodiments, at least one of the first reward and the second reward are based at least in part on a feedback signal from each of at least one WD. In some embodiments, the first reward is based at least in part on at least one mean value of reference signal received power, RSRP, received from at least one WD in a cell. In some embodiments, the first reward is based at least in part on mean RSRP values that fall between two RSRP thresholds. In some embodiments, the second reward is based at least in part on a percentage of WDs having a reference signal received power, RSRP, that exceeds a threshold. In some embodiments, the plurality of phase offset trial values selected from a set of values within a range of zero to 360 degrees. In some embodiments, a subsequent phase offset corresponds to a phase offset of the plurality of phase offset trial values that provides a highest reward. In some embodiments, the processing circuitry is also configured to update a probability density function based at least in part on a reward obtained from applying a subsequent phase offset corresponding to the probability density function.

In some embodiments, a method includes for each of a plurality of phase offset trial values: determine a first reward in response to first phase offset trial value applied to each of at least one antenna element having a first polarization; and determine a second reward in response to a second phase offset trial value applied to each of at least one antenna element having a second polarization. The process also includes determining a subsequent first phase offset to be applied to each of the at least one antenna element having the first polarization based at least in part on the plurality of first rewards and based at least in part on a probable reward in response to the subsequent first phase offset. The process also includes determining a subsequent second phase offset to be applied to each of the at least one antenna element having the second polarization based at least in part on the plurality of second rewards and based at least in part on a probable reward in response to the subsequent second phase offset.

In some embodiments, determining a subsequent phase offset is based at least in part on a Thompson sampling algorithm. In some embodiments, the Thompson sampling algorithm is configured to model the probable reward based at least in part on a Gaussian distribution. In some embodiments, at least one of the first reward and the second reward are based at least in part on a feedback signal from each of at least one WD. In some embodiments, the first reward is based at least in part on at least one mean value of reference signal received power, RSRP, received from at least one WD in a cell. In some embodiments, the first reward is based at least in part on mean RSRP values that fall between two RSRP thresholds. In some embodiments, the second reward is based at least in part on a percentage of WDs having a reference signal received power, RSRP, that exceeds a threshold. In some embodiments, the plurality of phase offset trial values selected from a set of values within a range of zero to 360 degrees. In some embodiments, a subsequent phase offset corresponds to a phase offset of the plurality of phase offset trial values that provides a highest reward. In some embodiments, the process also includes updating a probability density function based at least in part on a reward obtained from applying a subsequent phase offset corresponding to the probability density function.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
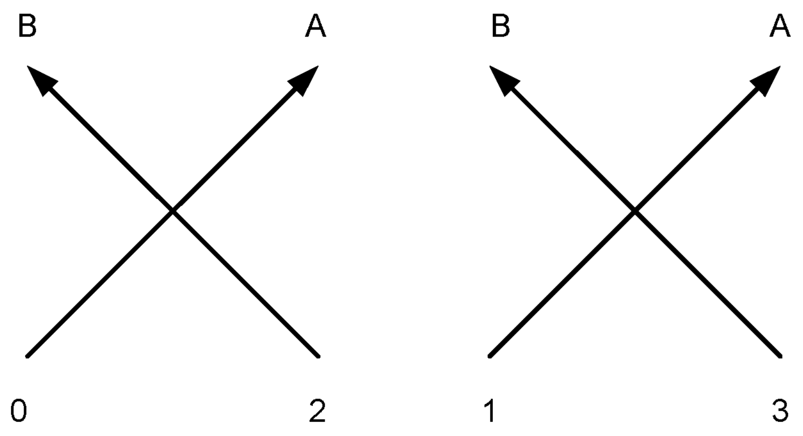
FIG. 1 is a simplified illustration of two sets of cross-polarized antenna elements.

Before describing in detail exemplary embodiments, it is noted that the embodiments reside primarily in combinations of apparatus components and processing steps related to cell shaping with reinforced learning. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as “first” and “second,” “top” and “bottom,” and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising.” “includes” and/or “including” when used herein, specify the presence of stated features, integers, steps, operations, elements, and/or components, but do not preclude the presence or addition of one or more other features, integers, steps, operations, elements, components, and/or groups thereof.

In embodiments described herein, the joining term, “in communication with” and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term “coupled,” “connected,” and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms “a”, “an” and “the” are intended to include the plural forms as well, unless the context clearly indicates otherwise. It will be further understood that the terms “comprises,” “comprising.” “includes” and/or “including” when used herein, specify the presence of stated features, integers, steps, operations, elements, and/or components, but do not preclude the presence or addition of one or more other features, integers, steps, operations, elements, components, and/or groups thereof.

The term “network node” used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term “radio node” used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments are directed to cell shaping with reinforced learning.

Referring to the drawing figures, in which like elements are referred to by like reference numerals, there is shown in in FIG. 1 an example four branch antenna with antenna branches 0, 1, 2 and 3. As used herein, a the terms "antenna element" and "antenna branch" are synonymous. Antenna ranches 0 and 1 are of a first polarization A and antenna branches 2 and 3 are of a second polarization B. A common weight for the 4-branch radio can take the general form of a vector, $[1\ e^{\Delta_A}\ 1\ e^{\Delta_B}]$, with each element in the vector being a weight applied to antenna branches 0, 1, 2, 3, respectively.

Let $\theta_0$, $\theta_1$, $\theta_2$, $\theta_3$ be the phases of each antenna branch 0, 1, 2, 3, and $\varnothing_A=\theta_0-\theta_1$, $\varnothing_B=\theta_2-\theta_3$ be the phase delta for polarization A and B before applying a compensation. In some embodiments, an algorithm disclosed herein is used to find phase compensation offsets $\Delta_A$ and $\Delta_B$ that give an optimal cell coverage, i.e., $\varnothing_{A_optimal}=\varnothing_A+\varnothing_A$ and $\varnothing_{B_optimal}=\varnothing_B+\varnothing_B$. The same wireless signals transmitted on two branches of one polarization will form a beam over the air with a beam direction determined by the phase delta $\varnothing_A$ or $\varnothing_B$. The values of $\varnothing_A$ and $\varnothing_B$ will determine the coverage shape of the cell. Some embodiments disclosed herein apply machine learning (artificial intelligence) techniques to finding an optimal cell coverage. For example, some embodiments structure the determination of phase compensation offsets $\varnothing_A$, $\varnothing_B$ that yield $\varnothing_{A_optimal}$, $\varnothing_{B_optimal}$ as a multi-armed bandit (MAB) problem and apply Thompson sampling to find a maximum reward.

In some embodiments, common precoding weights are found that may be applied to downlink (DL) signals and channels, particularly SSBs, to obtain a higher accumulated reward. In some embodiments, the reward may be determined as a function of individual reference signal received power (RSRP) of each WD in a cell or a mean RSRP of selected WDs, or a percentage of WDs having an RSRP greater than a threshold. When a mean RSRP of selected WDs is the reward, the beam from the common precoding weight will point to the center of gravity of the selected WD cluster regardless of calibrated or uncalibrated antennas. When the percentage of WDs having an RSRP greater than a threshold is the reward, the beam of the common precoding weight will point to the WDs at an edge of the cell. Other measures of beamforming performance may be employed. The set $\varnothing_A$, $\varnothing_B$ may be selected from a set of uniformly spaced phase values between 0 and 360 degrees, in some embodiments.

Figure 2:
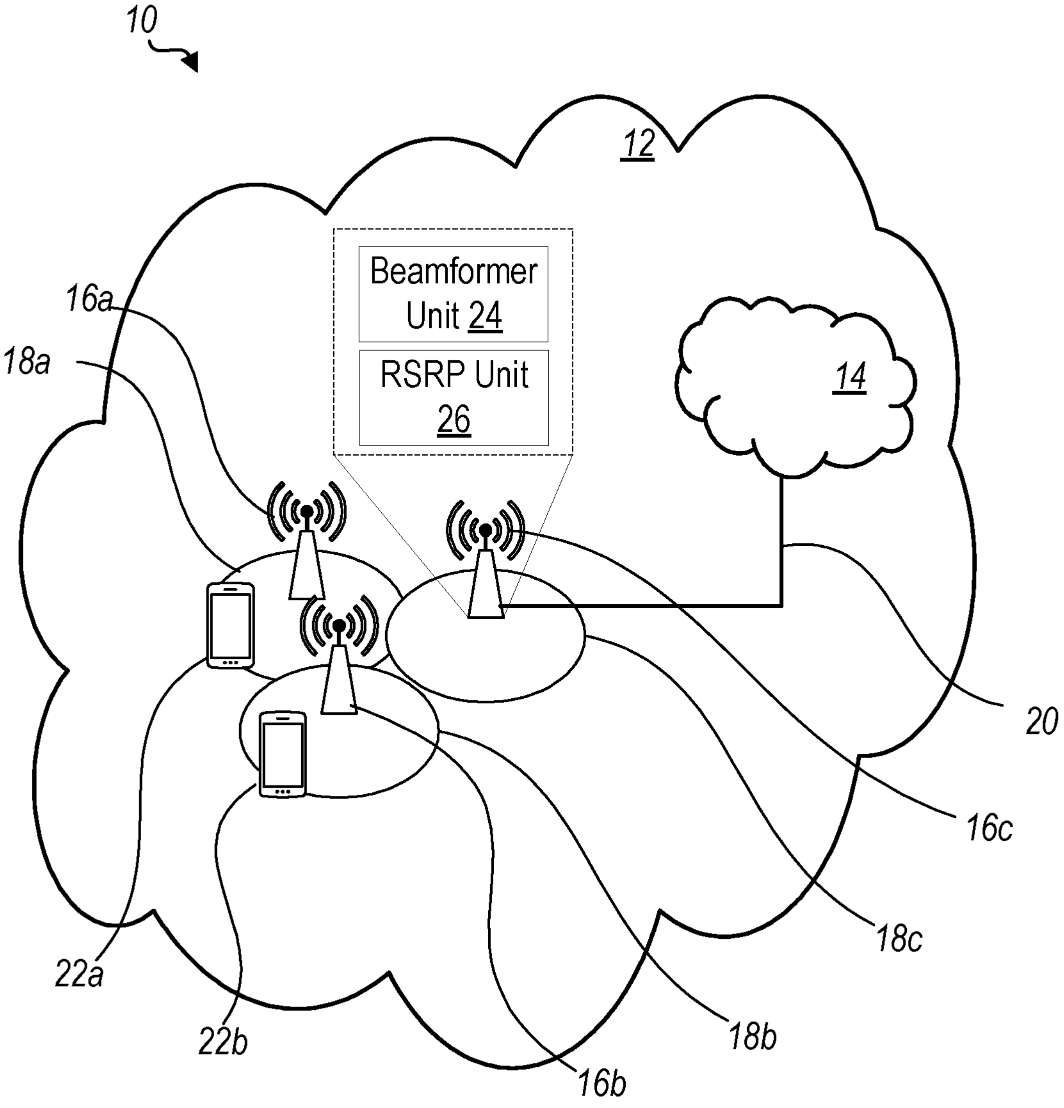
FIG. 2 is a schematic diagram of an example network architecture illustrating a communication system according to principles disclosed herein.

FIG. 2 is a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured to include a beamforming unit 24 which is configured to determine a subsequent phase offset to be applied to signals applied to antenna elements of an array of antenna elements based at least in part on rewards obtained from past applied phase offsets and based at least on a probable reward in response to the subsequent phase offset. The reward may be calculated by an RSRP unit 26 of the network node 16 based at least in part on signals received from a plurality of WDs 22.

Example implementations, in accordance with an embodiment, of the WD 22 and network node 16 discussed in the preceding paragraphs will now be described with reference to FIG. 3.

The communication system 10 includes a network node 16 provided in a communication system 10 and including hardware 28 enabling it to communicate with the WD 22. The hardware 28 may include a radio interface 30 for setting up and maintaining at least a wireless connection 32 with a WD 22 located in a coverage area 18 served by the network node 16. The radio interface 30 may be formed as or may include, for example, one or more RF transmitters, one or more RF receivers, and/or one or more RF transceivers. The radio interface 30 includes an array of antenna elements 34 to radiate and receive signal(s) carrying electromagnetic waves. The array of antenna elements 34 may be an array of pairs of cross-polarized antenna elements as shown in FIG. 1.

In the embodiment shown, the hardware 28 of the network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16. For example, processing circuitry 36 of the network node 16 may include the beamforming unit 24 which is configured to determine a subsequent phase offset to be applied to signals applied to antenna elements of an array of antenna elements 34 based at least in part on rewards obtained from past applied phase offsets and based at least on a probable reward in response to the subsequent phase offset. The reward may be calculated by an RSRP unit 26 of the network node 16 based at least in part on signals received from a plurality of WDs 22.

The communication system 10 further includes the WD 22 already referred to. The WD 22 may have hardware 44 that may include a radio interface 46 configured to set up and maintain a wireless connection 32 with a network node 16 serving a coverage area 18 in which the WD 22 is currently located. The radio interface 46 may be formed as or may include, for example, one or more RF transmitters, one or more RF receivers, and/or one or more RF transceivers. The radio interface 46 includes an array of antennas 48 to radiate and receive signal(s) carrying electromagnetic waves.

The hardware 44 of the WD 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 56, which is stored in, for example, memory 54 at the WD 22, or stored in external memory (e.g., database, storage array, network storage device, etc.) accessible by the WD 22. The software 56 may be executable by the processing circuitry 50. The software 56 may include a client application 58. The client application 58 may be operable to provide a service to a human or non-human user via the WD 22.

The processing circuitry 50 may be configured to control any of the methods and/or processes described herein and/or to cause such methods, and/or processes to be performed, e.g., by WD 22. The processor 52 corresponds to one or more processors 52 for performing WD 22 functions described herein. The WD 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to WD 22.

Figure 3:
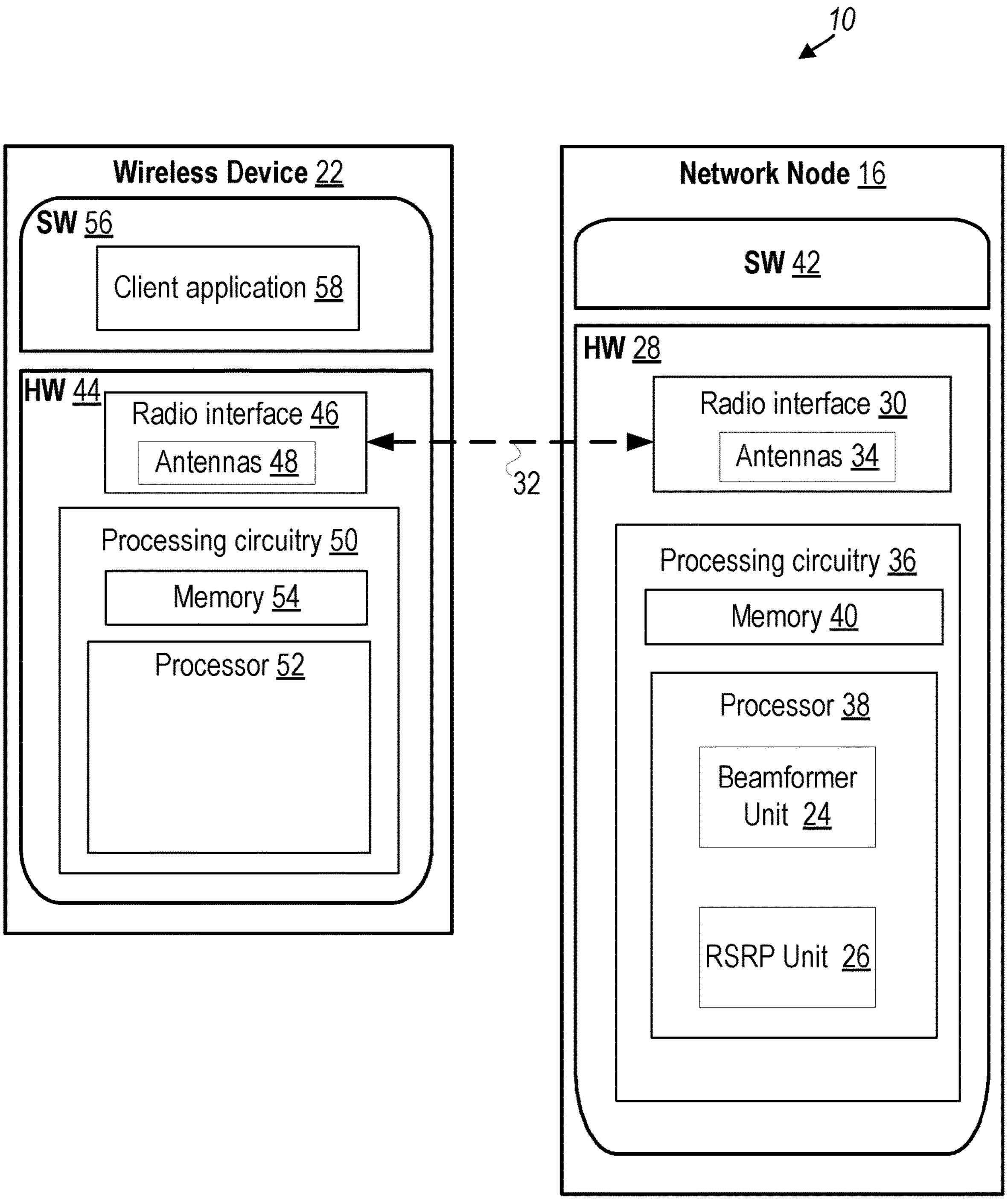
FIG. 3 is a block diagram of a network node in communication with a wireless device over a wireless connection according to some embodiments of the present disclosure.

In some embodiments, the inner workings of the network node 16 and WD 22 may be as shown in FIG. 3 and independently, the surrounding network topology may be that of FIG. 2.

The wireless connection 32 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 2 and 3 show various "units" such as beamforming unit 24 and RSRP unit 26 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 4:
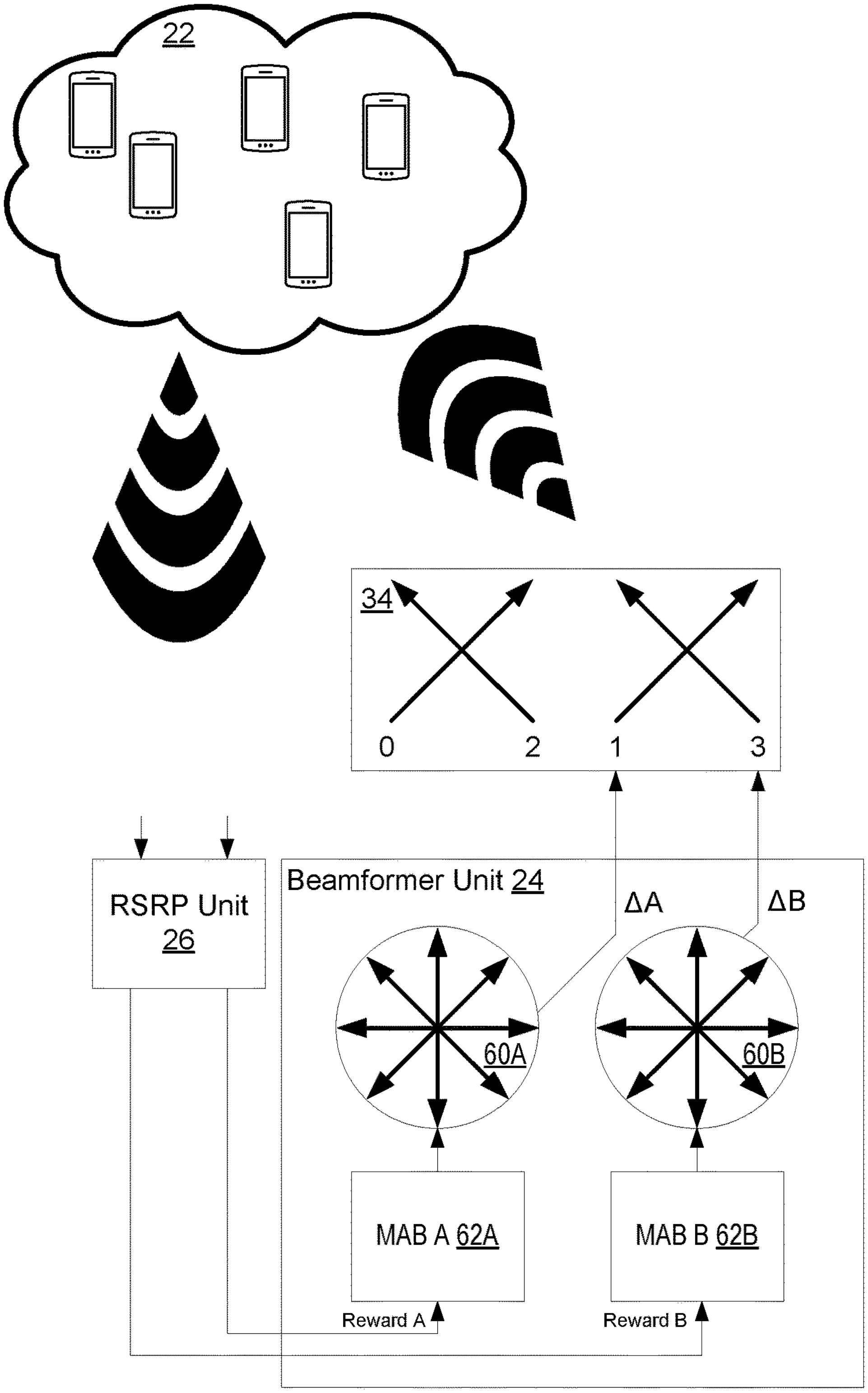
FIG. 4 is a block diagram illustrating cell shaping with reinforced learning using multi-armed bandit (MAB) analysis to select phase compensation values according to principles disclosed herein.

FIG. 4 is a block diagram of an example configuration for cell shaping with reinforced learning. A distribution of WDs 22 may receive signals transmitted by the antenna elements 34 on one or more beams that are at least in part, spatially separated. Beams are formed according to weights (multipliers) applied to the signals fed to each antenna element of the antenna elements 34. Although FIG. 4 shows two sets of cross-polarized antenna elements, there can be fewer or more sets of antenna elements. In some embodiments, the antenna array may not have cross-polarized antenna element pairs, but rather may include only antenna elements having a single polarization. Principles set forth herein may be applied to antenna elements having various relative polarization orientations.

In FIG. 4, the weights applied to the signals fed to a first polarized antenna element (branch) 1 and the weights applied to the signals fed to the second polarized antenna element 3, are selected according to an algorithm performed by the beamforming unit 24 that seeks to increase a measure of beamforming performance (hereinafter referred to as a "reward"). For example, the beamforming unit 24 may be configured to increase a reward that is based at least in part on the reference signal received powers (RSRPs) reported by each of a plurality of WDs 22 in one or more cells served by the network node 16. The RSRPs received by the RSRP unit 26, which may be received via antenna elements 34, may be processed to determine a reward for each polarization: Reward A for polarization A resulting from application of a compensation phase offset $\Delta_A$ to antenna elements 0 and 1, and Reward B for polarization B resulting from application of a compensation offset $\Delta_B$ to antenna elements 2 and 3.

Recall that $\varnothing_{A\_optimal}=\Delta_A+\Delta_A$, and $\varnothing_{B\_optimal}=\varnothing_B+\Delta_B$. Possible values of $\varnothing_A$ and $\varnothing_B$ are in the range [0, 360°]. The possible phase compensation offsets $\varnothing_A$, $\varnothing_B$ should also have the same range. The phase compensation offset range may be quantized with interval Δ, resulting in a set of possible phase compensation offsets: {0, Δ, 2Δ, . . . 360−Δ} (a total of $$\frac{360}{\Delta}$$

values), there being a set of possible phase compensation offsets for each polarization A and B. These possible values are represented in FIG. 4 by set 60A and set 60B, respectively, which may be stored within the beamforming unit 24 and/or the memory 40 of the network node 16.

The problem of cell shaping is to find $\Delta_A$, $\Delta_B$ among the quantized values in the sets 60A and 60B to produce $\varnothing_{A\_optimal}=\varnothing_A+\Delta_A$, and $\varnothing_{B\_optimal}=\varnothing_B+\Delta_B$. The measure of performance (reward) may in turn be a measure of optimality of the beamforming by the beamforming unit 24. The problem of determining optimal beamforming may be cast as a reinforced learning problem. In particular, using a Multi-Armed Bandit (MAB) formulation for $\Delta_A$ and $\Delta_B$, the beamforming unit 24 may continuously learn to select $\Delta_A$ and $\Delta_B$ that produces the optimal beam excitation phases $\varnothing_{A_optimal}$ and $\varnothing_{B_optimal}$.

An MAB problem involves finding from a finite set of inputs, the subset of inputs that maximizes a reward. In the present case, the MAB problem involves selecting the values $\Delta_A$, $\Delta_B$ from the corresponding sets 60A and 60B of possible phase compensation values that maximize a measure of beamforming performance. Accordingly, for each polarization, or at least one polarization, there is provided an MAB unit 62A, 62B. Each MAB unit 62A and MAB unit 62B selects a possible phase compensation value of from each set, 60A, 60B, respectively. In MAB terminology, each possible phase compensation value is called an arm.

In some embodiments, Thompson sampling is used to solve the MAB problem, i.e., to find the values $\Delta_A$, $\Delta_B$ from the corresponding sets 60A and 60B that maximizes a measure of beamforming performance. Thompson sampling is a methodology for successively applying an intelligently selected set of at least one input and determining a resultant reward for each set. Each successive set is selected based in part on (1) knowledge of rewards obtained from previously selected sets of inputs and based in part on (2) current statistics of each input or set of inputs. The statistics of each input or set of inputs are updated based at least in part on the knowledge of rewards acquired by application of the most recent input or set of inputs. In the present case, the successive sets of inputs are successive sets of values of $\Delta_A$, $\Delta_B$ from the corresponding sets 60A and 60B. The reward is a measure of beam performance as determined by information and/or signals received from WDs distributed over a region to be covered by the network node 16 using multiple beams. The statistics of each set of values $\Delta_A$, $\Delta_B$ may be the mean and variance of a Gaussian probability density function for each value of $\Delta_A$ and each value of $\Delta_B$. Other probability distributions may be used.

The Thompson sampling process just described is implemented by each of the MAB units 62A and 62B to determine $\Delta_A$, $\Delta_B$, calculate the common weight [1 $e^{\Delta_A}$ 1 $e^{\Delta_B}$], and apply (multiply) the common weight to the signals to be fed to the respective ones of antenna branches 0, 1, 2, 3. The phase compensation offsets $\Delta_A$, $\Delta_B$ are thereby added to the phase of antenna branches 1 and 3, respectively.

As noted, the reward of each arm may be modeled as a Gaussian distribution with unknown mean and known precision $\tau_0$ or variance $$\sigma_0^2,$$

where $$\sigma_0^2 = \frac{1}{\tau_0}.$$

The reward in its most general form may be a function of the RSRPs of each of a plurality WDs, i.e., $f(RSRP_1, \ldots, RSRP_n)$. The reward A that is fed back to MAB unit 62A from RSRP unit 26 may be chosen as the mean or average value of the RSRPs of all WDs in a cell whose RSRP falls between a low threshold $Thresh_{RSRP_{Low}}$ and a high threshold $Thresh_{RSRP_{HIGH}}$. The reward B that is fed back to MAB unit 62B may be the percentage of WDs with an RSRP greater than a threshold $Thresh_{RSRP}$. Note that the two MAB units 62A and 62B may receive the same reward, in some embodiments. For example, both MAB units 62A and 62B may use mean cell RSRP or percentage of WDs with RSRP greater than a $Thresh_{RSRP}$, depending on which criteria produces a highest throughput for a current distribution of WDs 22, for example. Other rewards may be employed that indicate beam performance. Herein, the rewards used for beam performance may be used as surrogate indicators of how well each beam aligns with a direction intended for the beam.

In each Thompson sampling (TS) period, all arms (possible phase compensation offsets in sets 60A, 60B) of the present MAB problem may be sampled from their probability density function (PDF). Then, the phase compensation offsets $\Delta_A$ and $\Delta_B$ that produce the maximum or highest rewards are chosen and used to determine the precoding weights [1 $e^{\Delta_A}$ 1 $e^{66\ B}$]. After the newly calculated common precoding weights are applied, the rewards are then collected at the end of the TS period. The probability distribution function (PDF) of the phase compensation offsets that were last applied are then updated by the MAB units 62A, 62B based at least in part on the reward resulting from their application and further based at least in part on measurement precision, as explained below. Over time, the phase compensation offsets $\Delta_A$ and $\Delta_B$ with higher rewards A and B will have PDFs with higher means and narrower distributions (smaller variance and greater precision), thereby increasing the probability that these compensation offsets will be selected again. The maximum precision of the PDFs of each arm can be capped to allow a certain degree of exploitation, i.e., applying different phase compensation offsets $\Delta_A$ and $\Delta_B$ to find a better reward due to changing conditions (such as a change in the channels seen by the WDs 22).

Figure 5:
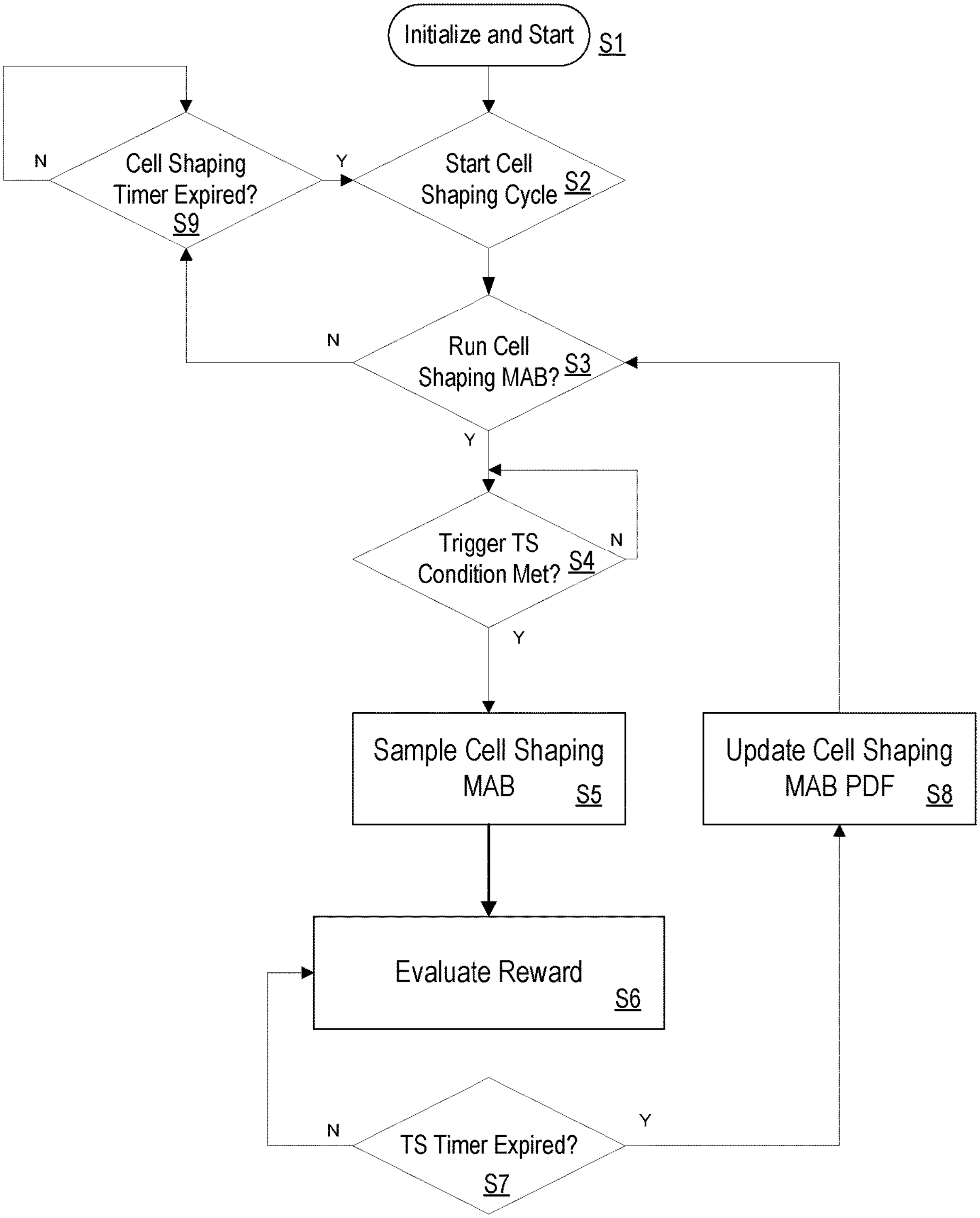
FIG. 5 is a flowchart of an example process in a network node for cell shaping with reinforced learning according to principles disclosed herein.

FIG. 5 is a flowchart of an example process for cell shaping with reinforced learning that includes the following steps:

Step S1: Initialize/Start: Construct $$\frac{360}{\Delta}$$

number of possible phase compensation offset values, 0, Δ, 2Δ, . . . 360−Δ to create sets 60A and 60B. A Gaussian PDF of each arm is initialized with an initial mean $\mu_0$ and an initially low precision $\tau_0$ (large variance, $$\sigma_0^2 = \frac{1}{\tau_0}\Big);$$

Step S2: Reset the TS timer $T_{TS}$ for cell shaping with periodicity $T_{cycle}$ and start the TS timer $T_{TS}$. Set the counter $C_{cMAB}$ to 0, where $C_{cMAB}$ is the number of Thompson sampling periods that MAB units 62A 62B have run in the current cell shaping cycle;

Step S3: Check if $C_{cMAB}$<$Thresh_{cMAB}$: if yes proceed to Step S4; otherwise go to Step S9. Threshold $Thresh_{cMAB}$ is a pre-determined value related to the convergence speed of the Thompson sampling of MAB unit 62A and MAB unit 62B, a higher convergence speed corresponding to a lower threshold $Thresh_{cMAB}$;

Step S4: TS triggering condition: if the number of radio resource control (RRC)-connected WDs is greater than a threshold $Thresh_{Connected\_UEs}$, then start TS timer $T_{TS}$ and proceed to Step S5. Otherwise stay at Step S4 until the number of RRC-connected WDs is greater than the threshold, $Thresh_{connected\_UEs}$;

Step S5: Sample the PDF of all phase compensation offset values $\Delta_A$, $\Delta_B$ and select the respective phase compensation offset value that results in a maximum reward. Calculate and update the common weight [1 $e^{\Delta_A}$ 1 $e^{\Delta_B}$] with the chosen respective phase compensation offsets $\Delta_A$ and $\Delta_B$. The step of selecting the respective phase compensation value resulting in a maximum reward includes determining a reward for each applied value of $\Delta_A$ and $\Delta_B$. The following rewards, and/or other rewards, may be determined by the RSRP unit 26 as follows:

a. Collect the RSRP value $x_i$ of all WDs;

b. Determine Reward A based at least in part on the mean RSRP of all connected WDs whose RSRP satisfy: $Thresh_{RSRP_{LOW}} \le x_i \le Thresh_{RSRP_{HIGH}}$; the mean of all such WDs may be determined as:

$$x = \frac{1}{N}\sum_{i=1}^{N} x_i;$$

c. Determine Reward B based at least in part on the percentage of WDs with RSRP greater than a $Thresh_{RSRP}$;

Step S6: Keep evaluating the reward until the Thompson sampling timer $T_{TS}$ expires;

Step S7: When the timer $T_{TS}$ expires and this is the first Thompson sampling period in a cycle, then: update the mean of the PDFs (Step S8) of the possible phase compensation offsets $\Delta_A$ and $\Delta_B$ with the mean value calculated in Step S5: $\mu_0$=x. At each subsequent Thompson sampling period in the cycle, the mean and variance may be updated as follows.

For the phase compensation offsets $\Delta_A$ and $\Delta_B$ just applied, update the mean and precision of the PDF of each value as follows:

a. The mean $\mu_0$ of the PDF may be determined as:

$$\mu_0 = \frac{\tau_0}{\tau_0 + \tau}\mu_0 + \frac{\tau}{\tau_0 + \tau}x;$$

b. The precision $\tau_0$ of the PDF may be updated based at least in part on the min ($\tau_0+\tau$, $\tau_{max}$) where $\tau_0$ is the current precision of the PDF, τ is the precision based at least in part on the most recently applied $\Delta_A$ and $\Delta_B$. The precision t varies depending on the number of WDs N during the reward collection in Step S5. For example, τ, may be determined as follows:

1. $\tau=\tau_{low}+\min(N*k_\tau, \tau_{high})$. $k_\tau$ is a constant, $\tau_{low}$ and $\tau_{high}$ are lower and upper limits on τ; note that for this computation, the precision will linearly increase as the number of WDs whose signals are involved in the determination of rewards A and B increases;

c. Increase the counter $C_{cMAB}$ by 1;

d. Go to Step S3.

Step S9: Check if the cell shaping timer $T_{cycle}$. Start the next cell shaping cycle in Step S2 if the timer $T_{TS}$ has expire.

Figure 6:
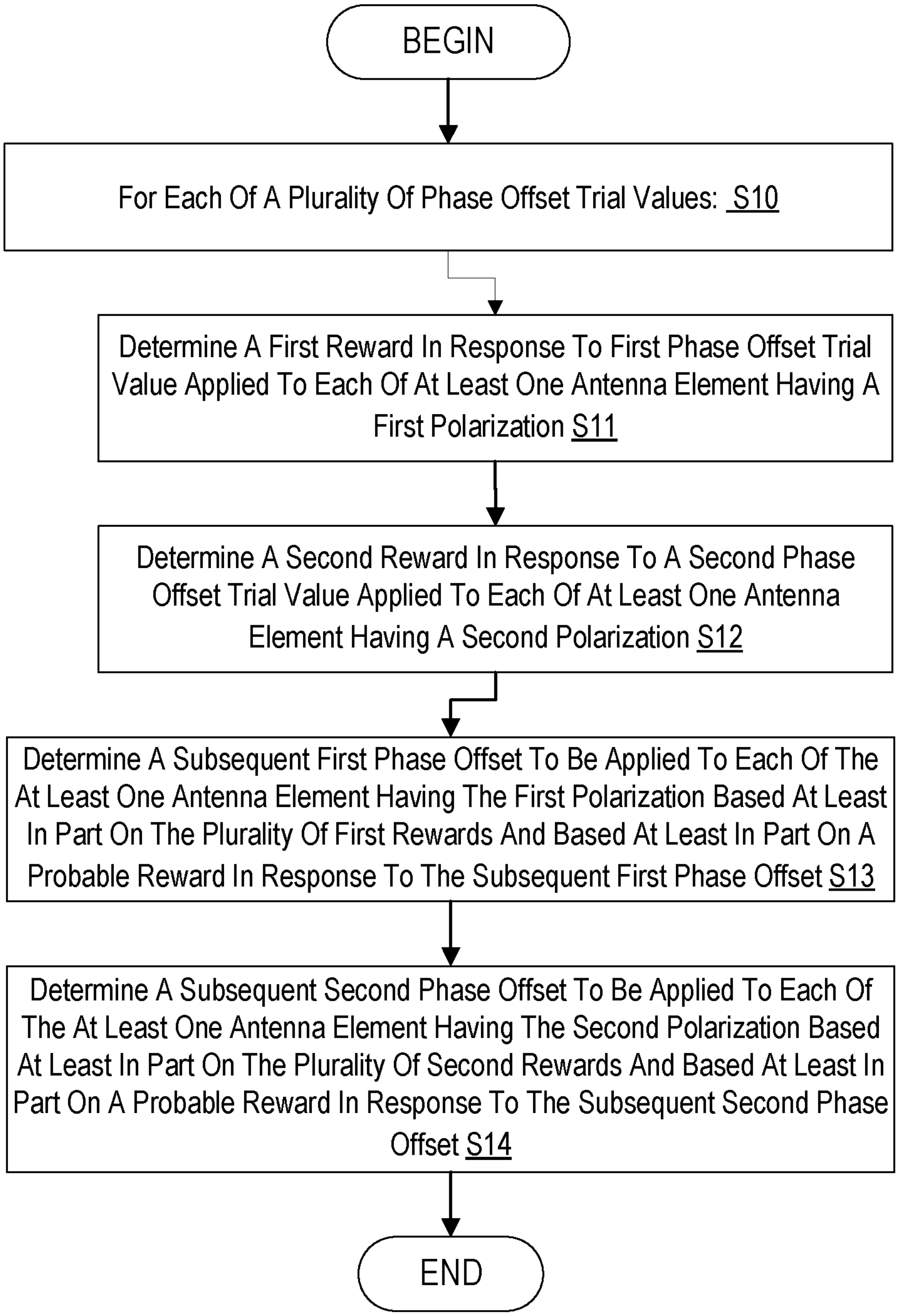
FIG. 6 is a flowchart of another example process in a network node for cell shaping with reinforced learning according to principles disclosed herein.

FIG. 6 is a flowchart of an example process in a network node 16 for cell shaping with reinforced learning. One or more blocks described herein may be performed by one or more elements of network node 16 such as by one or more of processing circuitry 36 (including the beamforming unit 24 and/or RSRP unit 26), processor 38, and/or radio interface 30. Network node 16 such as via processing circuitry 36 and/or processor 38 and/or radio interface 30 is configured to, for each of a plurality of phase offset trial values (Block S10): determine a first reward in response to first phase offset trial value applied to each of at least one antenna element having a first polarization (Block S11); and determine a second reward in response to a second phase offset trial value applied to each of at least one antenna element having a second polarization (Block S12). The process also includes determining a subsequent first phase offset to be applied to each of the at least one antenna element having the first polarization based at least in part on the plurality of first rewards and based at least in part on a probable reward in response to the subsequent first phase offset (Block S13). The process also includes determining a subsequent second phase offset to be applied to each of the at least one antenna element having the second polarization based at least in part on the plurality of second rewards and based at least in part on a probable reward in response to the subsequent second phase offset (Block S14).

In some embodiments, determining a subsequent phase offset is based at least in part on a Thompson sampling algorithm. In some embodiments, the Thompson sampling algorithm is configured to model the probable reward based at least in part on a Gaussian distribution. In some embodiments, at least one of the first reward and the second reward are based at least in part on a feedback signal from each of at least one WD. In some embodiments, the first reward is based at least in part on at least one mean value of reference signal received power, RSRP, received from at least one WD in a cell. In some embodiments, the first reward is based at least in part on mean RSRP values that fall between two RSRP thresholds. In some embodiments, the second reward is based at least in part on a percentage of WDs having a reference signal received power, RSRP, that exceeds a threshold. In some embodiments, the plurality of phase offset trial values selected from a set of values within a range of zero to 360 degrees. In some embodiments, a subsequent phase offset corresponds to a phase offset of the plurality of phase offset trial values that provides a highest reward. In some embodiments, the process also includes updating a probability density function based at least in part on a reward obtained from applying a subsequent phase offset corresponding to the probability density function.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for determining precoder weights to be applied to antenna elements of an array of antenna elements in a network node, the method comprising:

for each of a plurality of phase offset trial values:

determining a first reward in response to first phase offset trial value applied to each of at least one antenna element having a first polarization; and determining a second reward in response to a second phase offset trial value applied to each of at least one antenna element having a second polarization;

determining a subsequent first phase offset to be applied to each of the at least one antenna element having the first polarization based at least in part on the plurality of first rewards and based at least in part on a probable reward in response to the subsequent first phase offset;

determining a subsequent second phase offset to be applied to each of the at least one antenna element having the second polarization based at least in part on the plurality of second rewards and based at least in part on a probable reward in response to the subsequent second phase offset;

determining a subsequent phase offset being based at least in part on a Thompson sampling algorithm, the Thompson sampling algorithm configured to model the probable reward based at least in part on a Gaussian distribution; and at least one of the first reward and the second reward being based at least in part on a feedback signal from each of at least one wireless device (WD).

2. The method of claim 1, wherein the first reward is based at least in part on at least one mean value of reference signal received power, RSRP, received from at least one WD in a cell.

3. The method of claim 2, wherein the first reward is based at least in part on mean RSRP values that fall between two RSRP thresholds.

4. The method of claim 1, wherein the second reward is based at least in part on a percentage of WDs having a reference signal received power, RSRP, that exceeds a threshold.

5. The method of claim 1, wherein the plurality of phase offset trial values is selected from a set of values within a range of zero to 360 degrees.

6. The method of claim 1, wherein a subsequent phase offset corresponds to a phase offset of the plurality of phase offset trial values that provides a highest reward.

7. The method of claim 1, further comprising updating a probability density function based at least in part on a reward obtained from applying a subsequent phase offset corresponding to the probability density function.

8. The method of claim 1, wherein the first reward is based at least in part on at least one mean value of reference signal received power, RSRP, received from at least one WD in a cell.

9. The method of claim 1, wherein the second reward is based at least in part on a percentage of WDs having a reference signal received power, RSRP, that exceeds a threshold.

10. The method of claim 1, wherein a subsequent phase offset corresponds to a phase offset of the plurality of phase offset trial values that provides a highest reward.

11. The method of claim 1, further comprising updating a probability density function based at least in part on a reward obtained from applying a subsequent phase offset corresponding to the probability density function.

12. A network node configured to determine precoder weights to be applied to antenna elements of an array of antenna elements, the network node comprising processing circuitry configured to:

for each of a plurality of phase offset trial values:

determine a first reward in response to first phase offset trial value applied to each of at least one antenna element having a first polarization; and determine a second reward in response to a second phase offset trial value applied to each of at least one antenna element having a second polarization;

determine a subsequent first phase offset to be applied to each of the at least one antenna element having the first polarization based at least in part on the plurality of first rewards and based at least in part on a probable reward in response to the subsequent first phase offset; and determine a subsequent second phase offset to be applied to each of the at least one antenna element having the second polarization based at least in part on the plurality of second rewards and based at least in part on a probable reward in response to the subsequent second phase offset, determining a subsequent phase offset being based at least in part on a Thompson sampling algorithm, the Thompson sampling algorithm configured to model the probable reward based at least in part on a Gaussian distribution, and at least one of the first reward and the second reward being based at least in part on a feedback signal from each of at least one wireless device (WD).

13. The network node of claim 12, wherein the first reward is based at least in part on at least one mean value of reference signal received power, RSRP, received from at least one WD in a cell.

14. The network node of claim 13, wherein the first reward is based at least in part on mean RSRP values that fall between two RSRP thresholds.

15. The network node of claim 12, wherein the second reward is based at least in part on a percentage of WDs having a reference signal received power, RSRP, that exceeds a threshold.

16. The network node of claim 12, wherein the plurality of phase offset trial values selected from a set of values within a range of zero to 360 degrees.

17. The network node of claim 12, wherein a subsequent phase offset corresponds to a phase offset of the plurality of phase offset trial values that provides a highest reward.

18. The network node of claim 12, wherein the processing circuitry is further configured to update a probability density function based at least in part on a reward obtained from applying a subsequent phase offset corresponding to the probability density function.

* * * * *